C. B. POST.
TRACTOR.
APPLICATION FILED JAN. 2, 1919.

1,403,563.

Patented Jan. 17, 1922.
5 SHEETS—SHEET 1.

C. B. POST.
TRACTOR.
APPLICATION FILED JAN. 2, 1919.
1,403,563.
Patented Jan. 17, 1922.
5 SHEETS—SHEET 5.
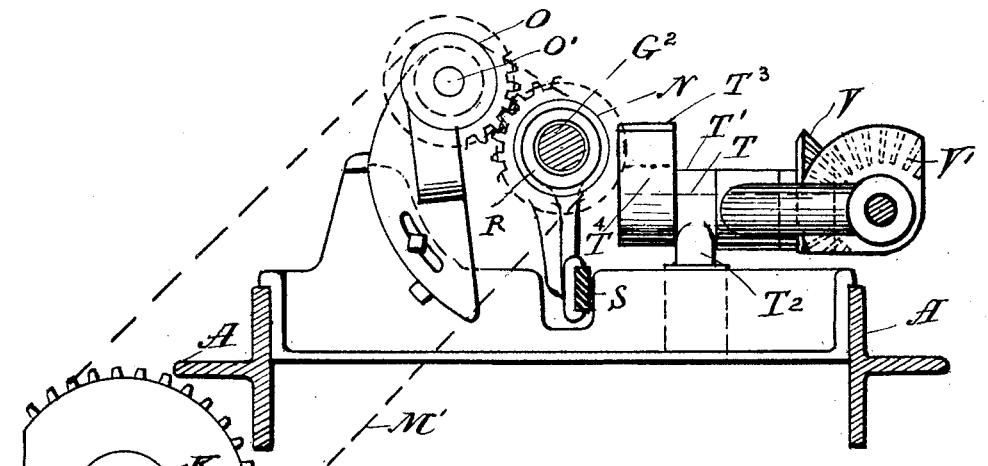
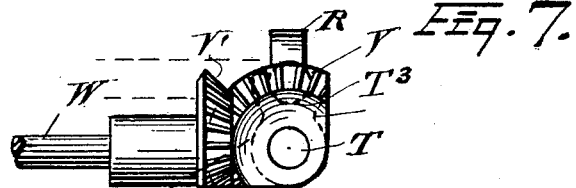
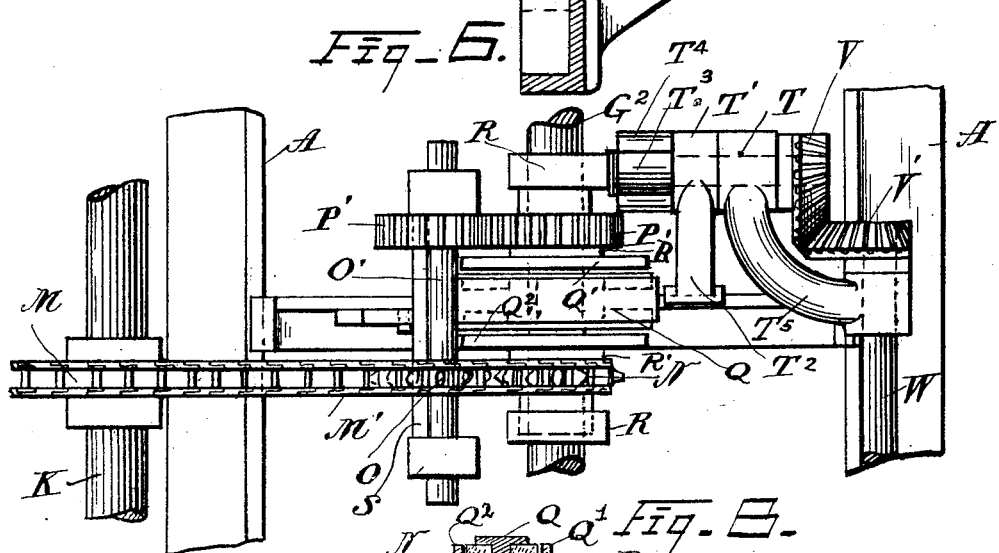
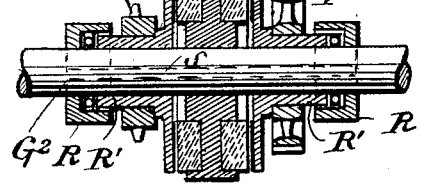

UNITED STATES PATENT OFFICE.

CHARLES B. POST, OF NEW LONDON, OHIO.

TRACTOR.

1,403,563. Specification of Letters Patent. Patented Jan. 17, 1922.

Application filed January 2, 1919. Serial No. 269,200.

*To all whom it may concern:*

Be it known that I, CHARLES B. POST, a citizen of the United States, and resident of New London, in the county of Huron and State of Ohio, have invented certain new and useful Improvements in Tractors, of which I hereby declare the following to be a full, clear, and exact description, such as will enable others skilled in the art to which it appertains to make and use the same.

The objects of the invention are to provide an improved form of tractor capable of a great diversity of use and flexibility of movement and constructed in a narrow and compact form, so as to occupy little ground space and thus adapt it to agricultural uses, and provided with positive drive means at front and rear thus increasing the power of traction under all circumstances. It is also characterized by great simplicity in construction and can be made at a low initial cost. The invention is also adapted for all uses to which tractors can be put.

The device is also characterized by laterally extended points of support for the frame, which prevents it from being capsized under any circumstances.

The invention includes a narrow frame from which the engine is suspended and front and rear traction wheels, rotatable upon vertical and horizontal axes, which give a large range of movement thereto, and which are mounted in the line of traction upon the frame. It includes also balancing or additional supporting wheels intermediate of the traction wheels and laterally offset from the frame; these wheels are mounted upon a rigid bail transversely pivoted in the frame, enabling the traction wheels to be positioned in a deep furrow or upon a ridge while the balancing wheels maintain the frame in a vertical position, and rest upon the ground at a different level.

This construction permits of the use of the device in plowing and cultivating between rows of crops, also the parts can be readily standardized and renewed quickly when broken, thus adding to its advantages for universal use.

The invention is hereinafter further described, shown in the accompanying drawings and specifically pointed out in the claims.

Figure 1:
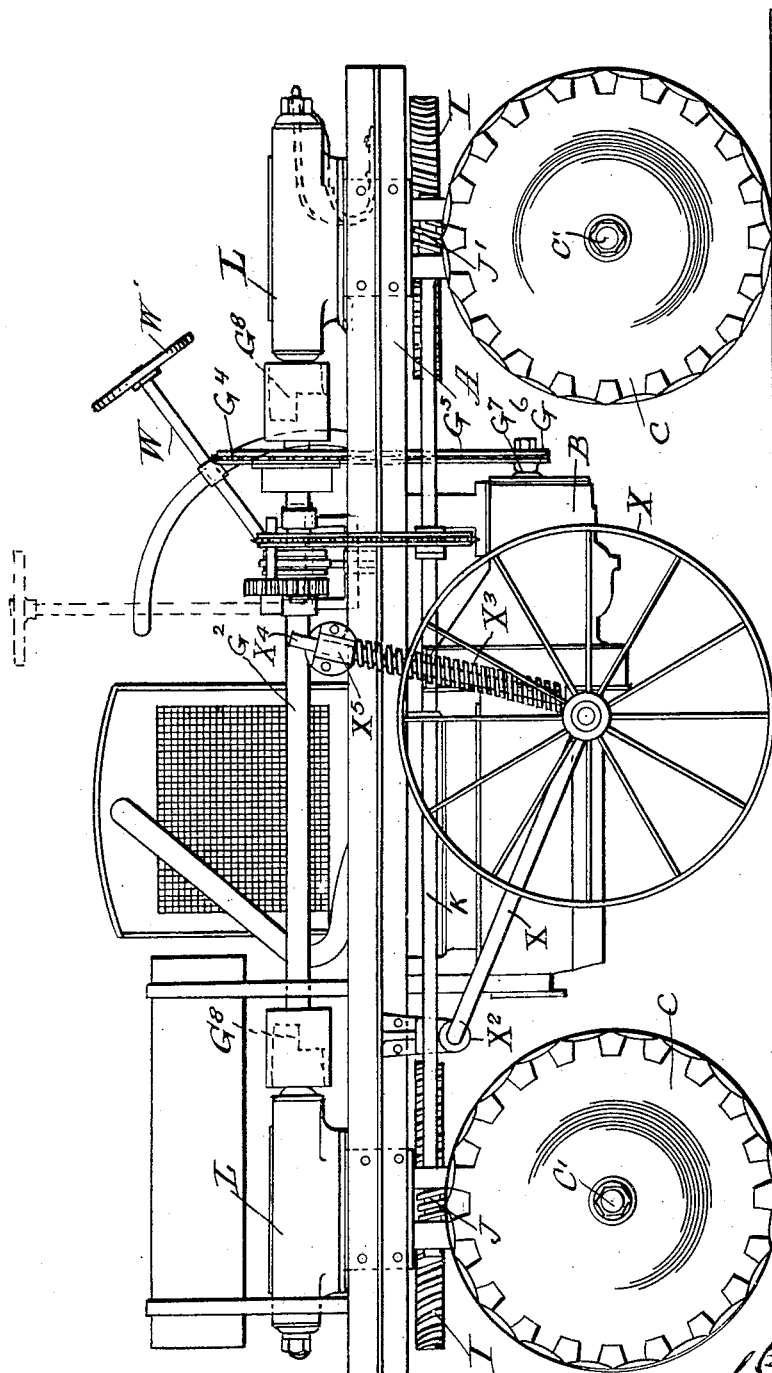
Figure 2:
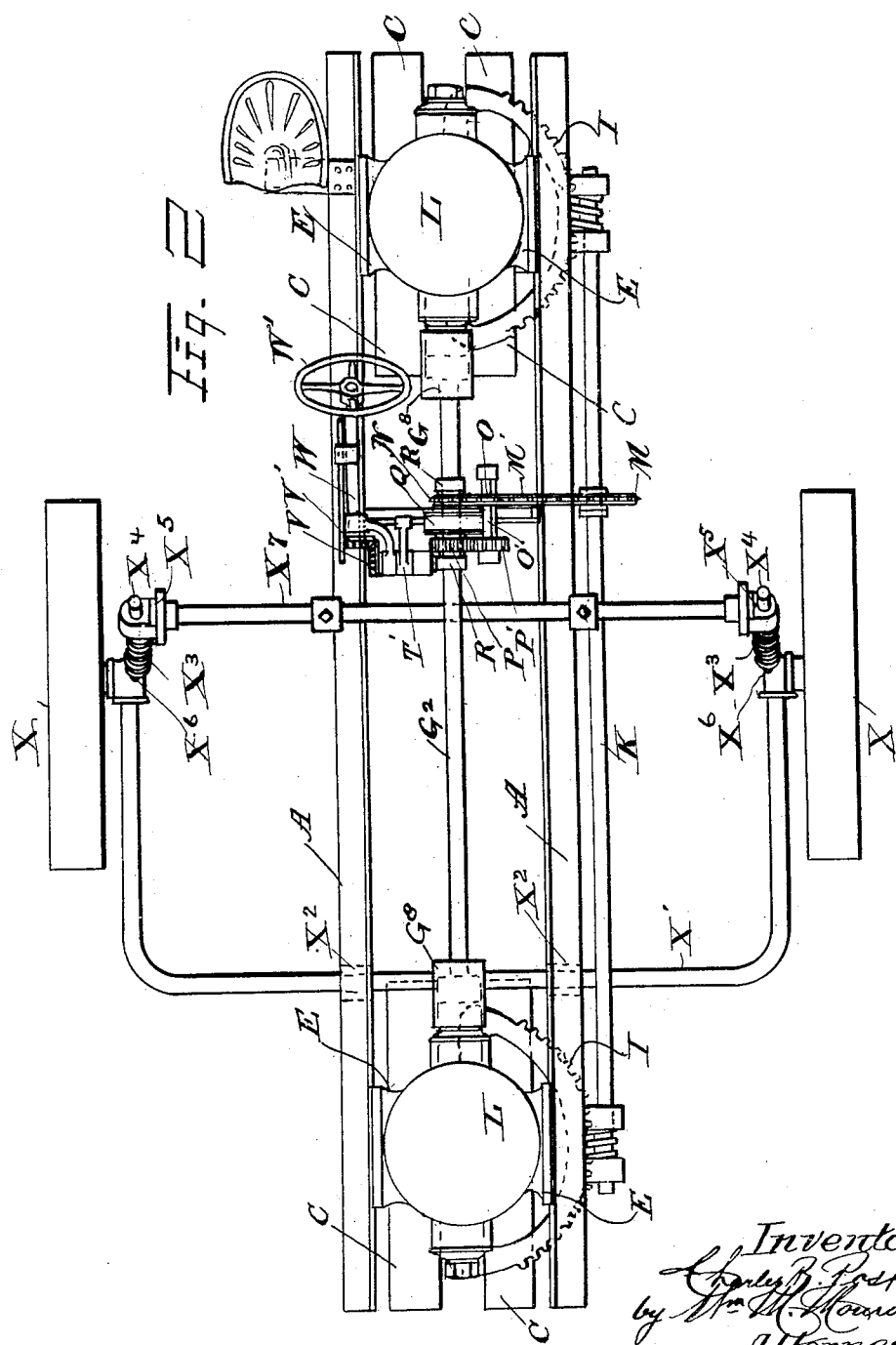
Figure 3:
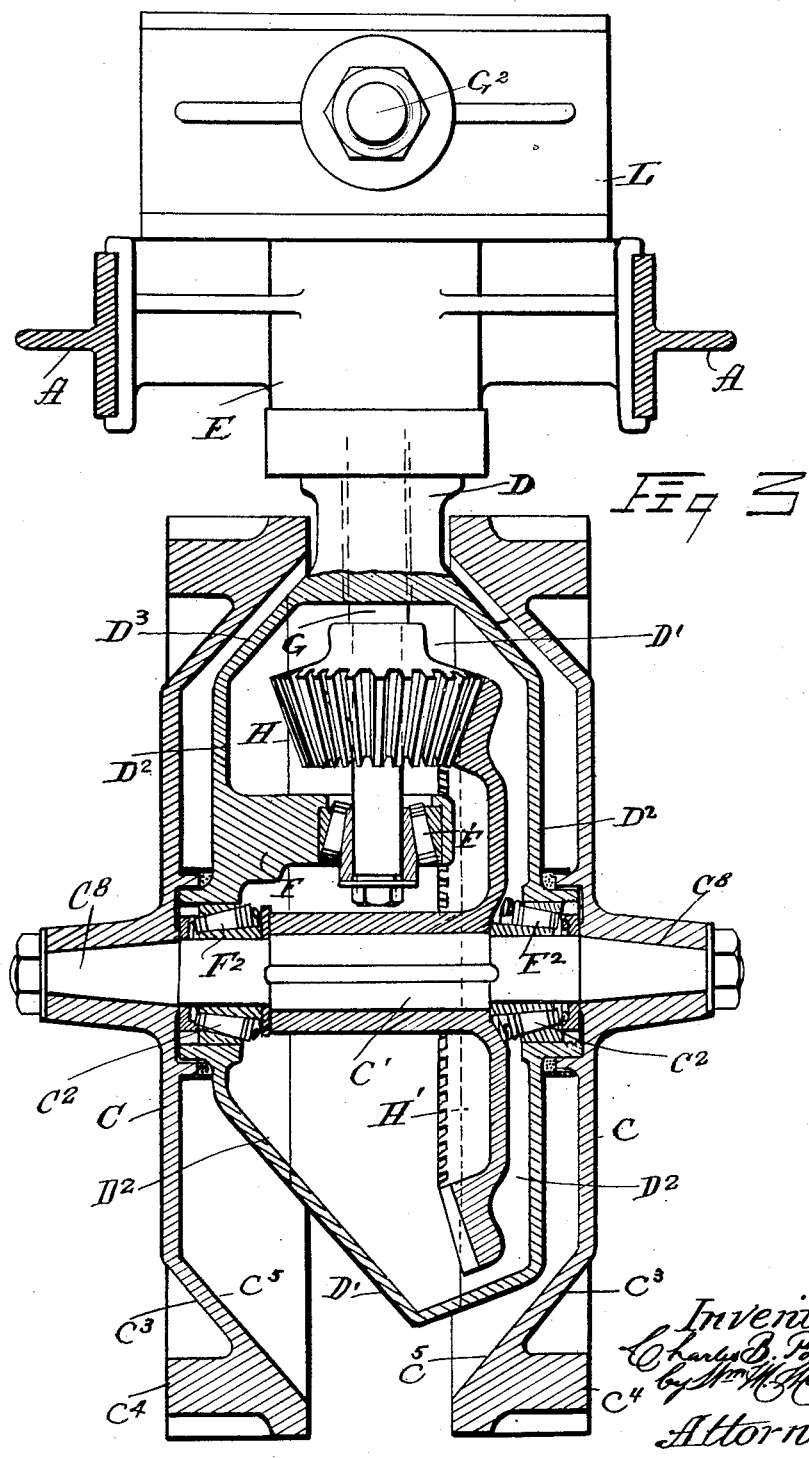
Figure 4:
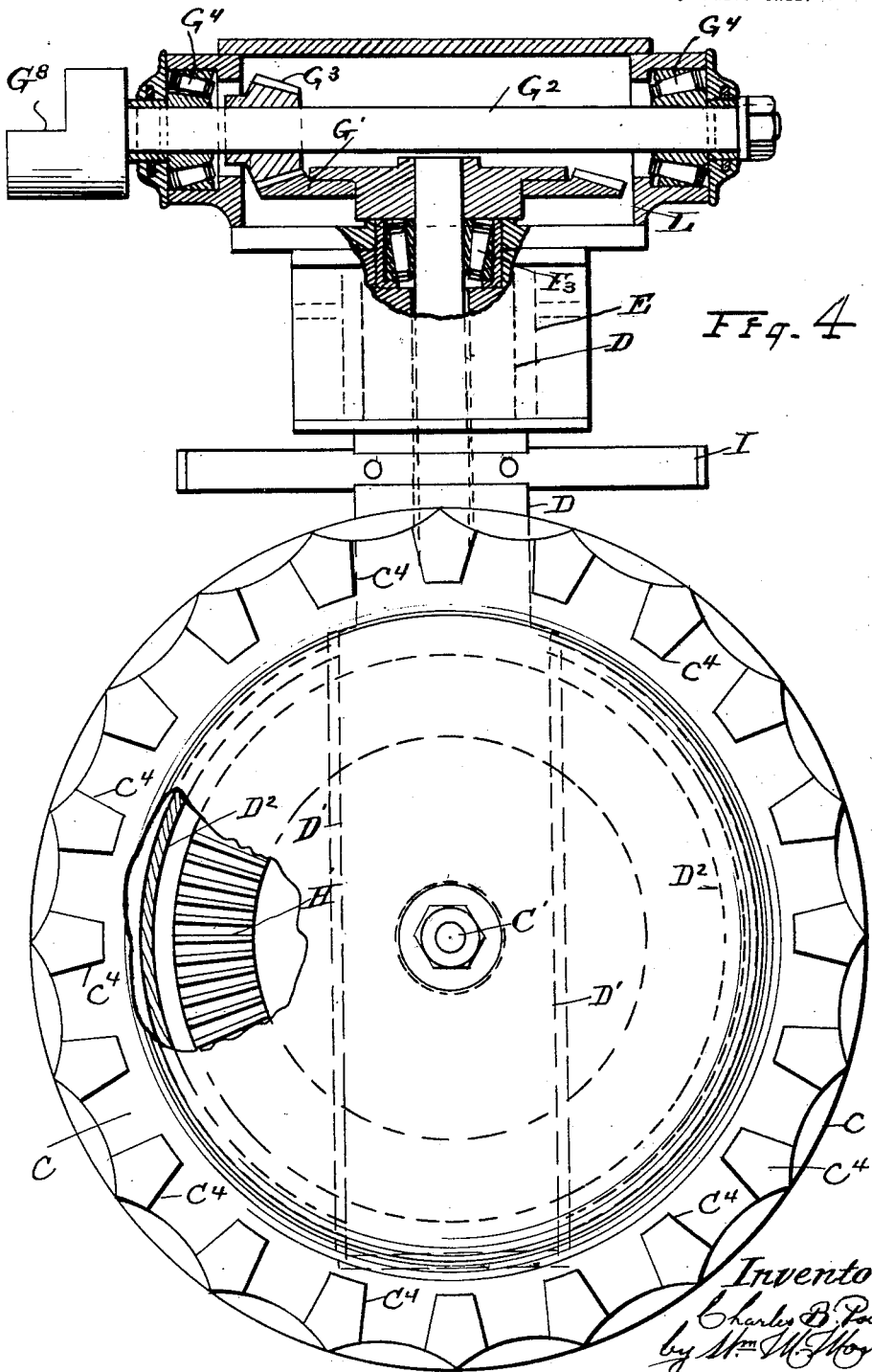

In the accompanying drawings Fig. 1 is a side elevation of the device. Fig. 2 is a plan thereof. Fig. 3 is a longitudinal vertical section of one of the traction wheels and axle bearing therefor showing the axle and vertical trunnion, on which the wheel and operating gear turns. Fig. 4 is a side elevation of one of said wheels showing in section the operating gearing for the trunnion. Fig. 5 is a transverse section of frame showing the steering mechanism. Fig. 6 is a plan thereof. Fig. 7 is an end elevation of shifting gear for the steering mechanism. Fig. 8 is a longitudinal section of the clutch, for reversing the steering mechanism.

In these views A is a narrow frame preferably formed of rigid T shaped longitudinal members.

B is the motor suspended from the frame to provide a low center of gravity for the machine.

C, C, are two circumferentially divided and power driven or tractor wheels, which are mounted respectively upon axles C' revolving in trunnions D, D, vertically revolvable in bearings E, E, at the front and rear of the frame and centrally positioned between the longitudinal frame members A, A, which compose the side members of the frame.

Each tractor wheel C is composed of two disc shaped members spaced apart on the horizontal axle C' which revolves in rollers $F^2$ in the spaced horizontal bearings $C^2$ $C^2$. These bearings $C^2$ $C^2$ for each wheel are integrally attached to the side of the looped lower extremity D' of the trunnion, which is as previously stated rotatable in one of the bearings E, between the frame members.

Within each trunnion is shown a vertical driving shaft G, and upon the upper end of each shaft G is secured a bevel gear G', and the gears G' G', on the two trunnions at the ends of the frame are rotated by means of a longitudinal shaft $G^2$ and pinions $G^3$ $G^3$ thereon. This shaft may be divided for convenience in assembling and the portions are connected by clutches $G^8$. The shaft $G^2$ is rotated by means of the sprocket wheel $G^4$, chain $G^5$ and drive gear $G^6$ on the engine shaft $G^7$ respectively. Each vertical driving shaft G is operatively connected with its adjoining wheel axle by means of the pinion H engaging the bevel gear H' secured to the axle.

The mechanism for rotating the trunnions in their vertical bearings to determine the direction of movement of the machine comprises segmental worm gears I, I, secured to the trunnions D underneath the frame, and right and left hand worms J, J', respectively mounted upon a common shaft K, which is rotated to turn the trunnions D, D, in opposite directions. This construction is clearly shown in Figs. 1 and 2.

To operate the steering shaft and permit the reversal of the movement at the will of the operator the following mechanism is employed:—As disclosed in Figs. 5, 6, 7 and 8.

Upon the worm shaft K, is mounted a sprocket wheel M over which the chain M' passes. The chain also passes over the sprocket wheel N loose upon the main shaft drive, and a third sprocket wheel O upon a counter shaft O' parallel with the main drive shaft.

A spur gear P is also loosely mounted upon the main driving shaft and engages spur gear P' upon the counter shaft. The sprocket wheel N and gear P are alternately brought into operative connection with the main drive shaft, by means of the intermediate clutch disc Q, which is secured to the main shaft and is alternately engageable with the disc, Q' and Q² on the gear and sprocket and will thus alternately revolve the worm shaft in opposite directions.

The sprocket wheel N and gear P are moved longitudinally of the shaft by means of the sleeves R, R, connected together by means of the bar S, so as to move in unison.

A transversely placed shaft T mounted in a bearing T' upon a bracket T² is provided with an eccentric projection T³ which engages a fork T⁴ in a projection upon one of the sleeves R.

The shaft T is rotated by means of the bevel gear V, and a second bevel gear V' which is mounted upon a steering shaft or rod W, provided with a steering gear W'. The steering shaft W and its bearings are rotatable about the shaft T and supported thereon, upon the bearing T⁵ so that the shaft can be placed at any desired angle for convenient use.

When placed in a vertical position, the shaft W can be operated by rods or reins from a cultivator or riding plow drawn behind the tractor. This method of construction permits of continuously driving the machine and simultaneously directing its movements.

A horizontal bearing member F intermediate of the sides of the loop of the trunnion and integral with one of them provides a bearing for the lower end of the shaft G. Rollers F' reduce the friction upon these bearings, also roller bearings F³ reduce the friction at the upper end of the trunnion. The looped end of the trunnion D' D' encloses the gearing at the sides, and a special hollow annular guard member D² attached to the loops and covering the open sides thereof effectually prevents the entrance of dirt, dust or grit in to the operating mechanism.

The gears G' and pinions G³ G³ which operate the vertical shafts G G are protected by means of the hollow casings L L. Still further protection is provided for the gearings and bearings introduced between the members of the wheels by means of the conical outer surfaces at C³ C³ which shed the dirt taken up by the projecting lugs C⁴ C⁴ which extend laterally from the vertical edges of the wheels.

The inclined surface C⁵ C⁵ on the inner surfaces of the wheels also shed all dirt that may be elevated into the space beween the wheels. The upper sides of the loop D' and inclosure between them, are also inclined at D³ to assist in discharging material that may be thrown upon them.

The traction wheels are frusto-conical in shape, and have narrow bearing surfaces C⁸, which do not cut into and break up the surfaces of a hard roadway, while laterally extending lugs C⁴ C⁴, having their outer edges registering with the peripheries of the wheels will sink into the soil or road if soft and provide traction means therefor.

These lugs are wedge shaped to permit the soil to fall from between them, when it has been elevated by them.

The machine is prevented from tipping over by means of the stabilizing wheels X, X, which are placed on each side of the frame, intermediate of its ends.

The wheels are mounted upon the outer ends of the bail shaped bar X', which is pivoted transversely of the frame at X². The wheels are kept under spring pressure by means of coiled spring X³ X³ mounted upon rods X⁴ X⁴ which move freely in bearings X⁵ X⁵ mounted upon a transverse rod X⁷ upon the frame.

The lower ends of the rods are socketed in the wheel axles at X⁶ X⁶ so as to permit a swinging movement thereof. By means of these stabilizers the machine is balanced in a vertical position on irregular ground since the stabilizers rise and fall to accommodate themselves to irregularities in the surface of the ground and if one wheel should be lifted from the ground its weight will tend to preserve the balance of the machine and both springs X³ will be compressed.

Having described the invention what I claim as new and desire to secure by Letters Patent is:—

1. A tractor comprising, a narrow elongated frame, a bearing adjacent to each end of said frame, a vertical trunnion in each bearing, a horizontal axle in the lower extremity of each trunnion, a traction disc on said axle on each side of said trunnion, a vertical drive shaft and gearing for said axle, said drive shaft and axle mounted within said trunnion, a longitudinal drive shaft mounted on said frame and operatively connected with said vertical drive shafts at each end of said frame, and a motor on said frame operatively connected with said longituinal drive shaft.

2. In a tractor, in combination, a frame, a bearing in each end thereof, a vertical trunnion in each bearing, said trunnion having a looped lower extremity, a horizontal axle in each trunnion, bearings on the sides of said loop therefor, a spaced pair of traction discs secured to each axle, a vertical drive shaft in each trunnion and gearing operatively connecting each drive shaft and axle, said gearing enclosed within said loop, a common longitudinal drive shaft operatively connected with both said vertical drive shafts, a longitudinal steering shaft operatively connected with both of said trunnions for rotating the same, a motor on said frame operatively connected with said longitudinal drive shaft and mechanism permitting reversal of movement of said steering shaft, for operatively connecting said motor with said steering shaft.

3. In a tractor, a frame, a bearing at each end thereof, a trunnion in each bearing, traction means mounted upon each trunnion, a steering shaft in the frame, gearing connecting said shaft with said trunnions, said gearing adapted to revolve said trunnions in opposite directions, a main driving shaft and a counter shaft on said frame, sprocket wheels upon said steering shaft, main driving shaft and counter shaft, a common sprocket chain therefor, engaging gears upon the main driving shaft and counter shaft, the gears upon the main shaft being loose thereon, clutch mechanism intermediate of said gear and sprocket wheel on the main shaft, and manually operated mechanism for moving said clutch mechanism alternately into engagement with said loose gear and sprocket wheel.

4. In a tractor, in combination, a frame, a vertical trunnion rotatable therein, said trunnion having a housing at its lower end, the upper sides of said housing inclined downwards, axle bearings in the side of said fork, wheel members mounted upon the extremities of said axle exterior to said fork, the hubs of said wheel members sleeved over said bearings, a vertical shaft rotatable in said trunnion, a bearing therefor located between the sides of said housing, a pinion on said vertical shaft, between the sides of said housing, a bevel gear within said housing on said axle, means for rotating said trunnion, means for rotating said vertical shaft and hollow guard members, enclosing said pinion and bevel gear and secured to said housing, the said wheel members concaved on their inner faces to enclose the said axle and gears and housing.

5. In a tractor, a traction unit comprising, a bearing, a vertical trunnion revolvable therein, a housing at the lower end of said trunnion, a horizontal axle in said housing, a vertical shaft in said trunnion, gearing connecting said vertical shaft and axle, a closure for said housing, a tractor wheel mounted upon each end of said axle, said wheels concaved on their inner faces to enclose said housing and gears and to provide dirt discharging inner faces and provided with laterally extending wedge shaped lugs registering with the rims.

In testimony whereof, I hereunto set my hand this 18 day of Dec. 1918.

CHARLES B. POST.

In presence of—
 CHAS. F. SIPE,
 WM. M. MONROE.